United States Patent [19]
Bartmann et al.

[11] 3,829,571
[45] Aug. 13, 1974

[54] ANALGESIC COMPOSITION

[75] Inventors: Wilhelm Bartmann, Neuenhain/Taunus; Hans-Georg Alpermann, Kelkheim/Taunus, both of Germany

[73] Assignee: Farbwerke Hoechst Aktiengesellschaft vormals Meister Lucius & Bruning, Frankfurt/Main, Germany

[22] Filed: June 11, 1973

[21] Appl. No.: 368,471

Related U.S. Application Data

[62] Division of Ser. No. 210,614, Dec. 21, 1971, Pat. No. 3,772,298.

[30]     Foreign Application Priority Data
Dec. 23, 1970   Germany............................ 2063384

[52] U.S. Cl. ............................................... 424/250
[51] Int. Cl. ........................................... A61k 27/00
[58] Field of Search ..................................... 424/250

*Primary Examiner*—Stanley J. Friedman
*Attorney, Agent, or Firm*—Curtis, Morris & Safford

[57]         ABSTRACT

Analgesic compositions containing, as an essential active ingredient, 1-(1,2-diphenyl-2-formylvinyl)-4-methylpiperazine or an acid addition salt thereof with a physiologically tolerated acid. The active compound has the formula

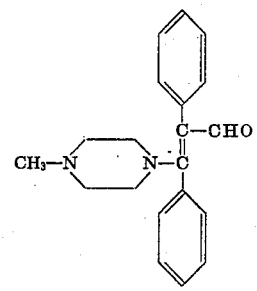

I

3 Claims, No Drawings

ANALGESIC COMPOSITION

This is a division of application Ser. No. 210,614 filed Dec. 21, 1971 now U.S. Pat. No. 3,772,298.

The present invention relates to 1-(1,2-diphenyl-2-formylvinyl)-4-methyl-piperazine having an analgesic action and corresponding to the formula I

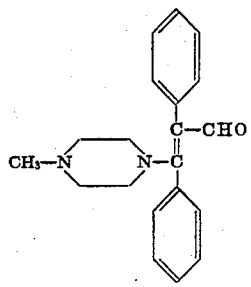

and its addition compounds with physiologically tolerated acids. Furthermore the present invention relates to a process for preparing the piperazine derivative of the formula I, wherein compounds of the formula II

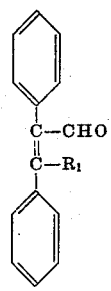

wherein $R_1$ represents bromine or chlorine, are reacted in non-aqueous solvents with 1 to 3 molar equivalents of an anhydrous N-methyl-piperazine and the compound obtained is optionally converted with physiologically tolerated acids into the salts thereof. [The reaction of β-chlorovinyl aldehydes with secondary amines to obtain the corresponding β-aminovinyl aldehydes is known from Z. Arnold et al., Collection Czechoslovak Chemical Communications, 24, 2385 (1959)].

As non-aqueous solvents, there may be used, for example, ethanol, acetonitrile, dimethylformamide, dimethyl sulfoxide, preferably aprotic solvents such as anhydrous benzene, toluene or xylene. The reaction is carried out at temperatures between 20°C and 140°C during a period of time of between 2 hours and several days, preferably by heating for 3 to 6 hours to 80° – 120°C. The operation can also be carried out in an inert gas atmosphere, optionally in the presence of a tertiary amine, for example triethylamine.

The compound of the formula I of the invention which contains both a carbonyl and an enamine function in the molecule is distinguished by a surprising stability which was not forseeable for this class of compounds. For example, the compound of the invention can be precipitated in unchanged form from an acetic acid solution by addition of alkali, whereas enamines are in general cleaved in the presence of water by catalytic amounts of organic acids. The compound of the invention forms crystalline salts with a number of dibasic organic acids such as fumaric acid, oxalic acid or succinic acid. Even with methane-sulfonic acid or with 2N-sulfuric acid, stable crystallized salts can be obtained with very good yields.

The compound of the present invention and its physiologically tolerated salts are distinguished by valuable analgesic properties. The sulfuric acid salt of the compound of the formula I was compared with Pyramidon in the following tests:

Test No. 1: Heat pain test on the mouse ("Brennstrahlmethode" (radiant heat method) according to L. Ther, E. Lindner, G. Vogel described in "Zur pharmakodynamischen Wirkung der optischen Isomeren des Metadons" in D. Apoth. Ztg. 103, page 514 – 520, 1963, according to which a light beam is directed on the upper proximal part of a mouse's tail and the time until reaction occurs is measured.)

Test No. 2: Hot plate test on a mouse (copper plate 56°C) according to G. Woolfe and A. D. McDonald, J. Pharmacolog. Exp. Ther. 80, 300 (1944).

Test No. 3: Electric excitation over tail electrodes on the rat (Test according to R. S. Grewal, Brit. J. Pharmacolog. 7, 433 (1952). The following values were obtained:

|  | Test 1 (Radiant heat) | Test 2 (Hot plate) | Test 3 (Electr. excitation) | Acute toxicity $LD_{50}$ i.V. mouse |
|---|---|---|---|---|
| 1-(1,2-Diphenyl-2-formylvinyl)-4-methylpiperazine-hydrogenosulfate | $ED_{50}$ 51 mg/kg s.c. | $ED_{50}$ 55 mg/kg s.c. | $ED_{50}$ 22 mg/kg s.c. | 72 mg/kg |
| Pyramidon | $ED_{50}$ 110 mg/kg s.c. | $ED_{50}$ 230 mg/kg s.c. | $ED_{50}$ could not be determined | 150 mg/kg |

It can be seen from the above dates that the compound of the invention is clearly superior to Pyramidon with regard to its analgesic properties.

The compounds of the invention may be used in pharmaceutical preparations having an analgesic action, in admixture with usual pharmaceutical carriers, solvents and excipients.

For oral administration, powders, tablets, dragees or capsules are used which contain the analgesic agent in a dosage between 0.05 and 0.5 g, preferably between 0.1 and 0.3 g, per single dose, in admixture with carriers such as lactose, starch, talc and similar carriers.

For parenteral administration, the compounds of the invention are suitably used in isotonic solutions.

The compounds of the invention with analgesic action may furthermore be used in combination with other drugs. As such, there may be used, in addition to other analgesic agents, for example antipyretic agents such as acetylsalicyclic acid, N-acetyl-p-aminophenol, phenacetin, pyrazolone derivatives, ethoxybenzamide or purine derivatives such as caffeine.

The following Examples illustrate the invention:

Example 1a 1-(1,2-Diphenyl-2-formylvinyl)-4-methylpiperazine 73 g (0.3 mole) of 3-chloro-2,3-diphenyl-acrylaldehyde (prepared according to M. Weissenfels and co-workers, Z. Chem. 6, 472 (1966)) were boiled with 60 g (0.6 mole) of N-methylpiperazine in 500 ml of anhydrous benzene for 4 hours under reflux. The reaction product was then allowed to stand for 72 hours at room temperature, washed twice with about 200 ml of 2N—NaOH and water and the solvent was removed by distillation under reduced pressure. The residue was dissolved at the boiling temperature in about 300 ml of diisopropyl ether by addition of ethyl acetate. Upon cooling, 73 g of thin-layer chromatographically uniform crystals melting at 142° (80 percent of the theory) crystallized.

Example 1b

In the same manner, 60.3 g of crystals melting at 142°C. (65 percent of the ory) were obtained from 86.5 g (0.3 mole) of 2-bromo-1,2-diphenylacrylaldehyde by reaction with (0.6 mole) of N-methylpiperazine.

The 2-bromo-1,2-diphenyl-acrylaldehyde was obtained according to M. Weissenfels and co-workers, Z. Chem. 6, page 472, (1966) from dimethylformamide, phosphorus tribromide and desoxybenzoin in trichloroethylene. Melting point 166°C.

EXAMPLE 2

1-(1,2-Diphenyl-2-formylvinyl)-4-methylpiperazine-methane-sulfate 9.3 g of 1-(1,2-diphenyl-2-formylvinyl)-4-methylpiperazine and 2.9 g of methane-sulfonic acid were dissolved in methanol, whereupon 12 g of the methanesulfonate melting at 203°C were obtained by precipitation with diethyl ether. The salt was clearly soluble in water and was not hydrolyzed after standing for 3 days.

EXAMPLE 3

In analogous manner, there was obtained the 1-(1,2-diphenyl-2-formylvinyl)-4-methylpiperazine-succinate; melting point 136° C.

EXAMPLE 4

In analogous manner there was obtained the 1-(1,2-diphenyl-2-formylvinyl)-4-methylpiperazine-fumarate; melting point 152° C.

EXAMPLE 5

1-(1,2-Diphenyl-2-formylvinyl)-4-methylpiperazine-bisulfate 15.3 g (0.05 mole) of 1-(1,2-diphenyl-2-formylvinyl)-4-methylpiperazine were dissolved in 150 ml of $CHCl_3$. 49 ml of $2N-H_2SO_4$ were added dropwise, while stirring. After stirring for about 1 hour, the solution solidified to a crystal magma, which was filtered off with suction and washed successively with chloroform, diisopropyl ether and a small amount of cold methanol. After drying, 15 g of the bisulfate having a decomposition point of above 210° C were obtained.

We claim:

1. Pharmaceutical composition having analgesic activity consisting essentially of an effective amount of an active ingredient and a pharmaceutically acceptable carrier therefor, said active ingredient being 1-(1,2-diphenyl-2-formylvinyl)-4-methyl-piperazine or an acid addition salt thereof with a physiologically tolerable acid.

2. Pharmaceutical composition as defined in claim 1 wherein the active ingredient is 1-(1,2-diphenyl-2-formylvinyl)-4-methylpiperazine-methane sulfonate.

3. Pharmaceutical composition as defined in claim 1 wherein the active ingredient is 1-(1,2-diphenyl-2-formylvinyl)-4-methylpiperazine-bisulfate.

* * * * *